United States Patent
Singhal

(10) Patent No.: US 12,321,907 B2
(45) Date of Patent: Jun. 3, 2025

(54) DATA PROCESSING UTILIZING A DIGITAL TAG

(71) Applicant: VISA INTERNATIONAL SERVICE ASSOCIATION, San Francisco, CA (US)

(72) Inventor: Ankush Singhal, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/533,061

(22) Filed: Dec. 7, 2023

(65) Prior Publication Data

US 2024/0104530 A1 Mar. 28, 2024

Related U.S. Application Data

(62) Division of application No. 17/384,384, filed on Jul. 23, 2021, now Pat. No. 11,875,319.

(51) Int. Cl.
*G06Q 20/10* (2012.01)
*G06Q 20/32* (2012.01)
*G06Q 20/40* (2012.01)
*H04L 67/55* (2022.01)

(52) U.S. Cl.
CPC ....... *G06Q 20/102* (2013.01); *G06Q 20/3276* (2013.01); *G06Q 20/401* (2013.01); *H04L 67/55* (2022.05)

(58) Field of Classification Search
None
See application file for complete search history.

(56) References Cited

U.S. PATENT DOCUMENTS

| 10,380,583 | B1 | 8/2019 | Ellis et al. | |
| 2021/0035086 | A1* | 2/2021 | Khan | G06Q 20/204 |

FOREIGN PATENT DOCUMENTS

KR 102160469 B1 9/2020

OTHER PUBLICATIONS

"Bharat QR", Vikaspedia, Available Online at https://vikaspedia.in/e-governance/digital-payment/cards-for-digitalpayments/bharat-qr, Jul. 23, 2021, 1 page.
Bhakta et al., "An Interoperable QR Code to Make Payments More Easy", Economic Times.com, Available Online at https://cio.economictimes.indiatimes. com/news/enterprise-services-and-applications/an-interoperable-qr-code-to-make-payments-more-easy/56267542, Dec. 31, 2016, 9 pages.

* cited by examiner

*Primary Examiner* — Scott S Trotter
*Assistant Examiner* — Amit Patel
(74) *Attorney, Agent, or Firm* — Kilpatrick Townsend & Stockton LLP

(57) ABSTRACT

A method is disclosed and includes receiving a push transfer message with a first transaction amount, and a digital tag, a credential or a token from an application server computer, in a transaction. In the transaction, a first user using a first user device interacts with a second user using the digital tag. The digital tag associated with the credential or the token, and the first user device has a transfer application that receives the digital tag and is in communication with the application server computer. The push transfer message is transmitted to an authorizing entity computer where a second amount is credited to the second user's account.

14 Claims, 6 Drawing Sheets

DATA PROCESSING UTILIZING A DIGITAL TAG

CROSS-REFERENCES TO RELATED APPLICATIONS

This application is a divisional patent application which claims the benefit of the filing date of U.S. patent application Ser. No. 17/384,384, filed Jul. 23, 2021, which is herein incorporated by reference in its entirety for all purposes

BACKGROUND

Many transactions are completed by exchanging a primary account number between a first user and a second user. Often, it is difficult to remember or correctly input the primary account number (e.g., a set of sixteen alphanumeric characters which links to an account) into a transfer application which can facilitate the transaction. Additionally, there may be privacy concerns with a first user learning the primary account number of a second user.

Many transfer applications allow users of the application to easily transact with other users of the same application. Such an application may use an alias (e.g., an email address, a phone number, etc.) to facilitate a transaction over a primary account number. The use of an alias allows for users to easily direct transactions to users of the same application, however the specific alias used may not be used by all transfer applications. Furthermore, email addresses and phone numbers are increasingly considered sensitive personal data and users may not be comfortable to share such data with parties the users do not trust.

Further, many resource providers may not generally allow transactions using transfer applications. For example, because many transfer applications are not associated with a specific processing network or are not associated with a payment device, many resource providers may not allow transactions using the transfer applications. Further, to allow for transactions to occur using a transfer application, a resource provider may be required to create an account for each transfer application and link a payment device or an account with an transaction institution. To allow for transactions to occur using multiple transfer applications, the resource provider may be required to create an account for each transfer application, which can be an inefficient process. Additionally, a user, when requesting to initiate a transaction with a resource provider with a specific transfer application, the user may be unaware of whether a resource provider has an account with the transfer application or be unable to identify account details relating to the resource provider specific to the transfer application.

Embodiments of the present invention address these problems and other problems individually and collectively.

BRIEF SUMMARY

One embodiment of the invention is directed to a method. The method can include receiving, by a processing network computer, a push transfer message comprising a first transaction amount, and a digital tag, a credential or a token from an application server computer, in a transaction where a first user using a first user device interacts with a second user using the digital tag. The digital tag can be associated with the credential or the token, the first user device executing a transfer application that receives the digital tag and is in communication with the application server computer. The method can also include parsing, by the processing network computer, the push transfer message to determine an authorizing entity computer associated with the primary account number or the token. The method can also include determining, by the processing network computer, an address associated with the authorizing entity computer.

The method can also include transmitting, by the processing network computer, the push transfer message comprising the primary account number to the authorizing entity computer, which credits the primary account number for a second amount that is determined by subtracting a remainder amount from the first transaction amount. The method can also include performing a settlement process between at least the processing network computer, the authorizing entity computer, and the application server computer. The processing network computer can provide a service amount to the application server computer, the service amount being less than the remainder amount. The processing network computer can also associate a remaining portion of the remainder amount with the processing network computer. The processing network computer can also provide the second amount to the authorizing entity computer.

Another embodiment of the invention includes a processing network computer. The processing network computer can include a processor and a non-transitory computer-readable medium. The non-transitory computer-readable medium can include instructions that, when executed by the processor, cause the processor to perform operations including receiving, by a processing network computer, a push transfer message comprising a first transaction amount, and a digital tag, a credential or a token from an application server computer, in a transaction where a first user using a first user device interacts with a second user using the digital tag. The digital tag can be associated with the credential or the token, and the first user device can comprise a transfer application that receives the digital tag and is in communication with the application server computer. The instructions can further cause the processor to perform operations including parsing, by the processing network computer, the push transfer message to determine an authorizing entity computer associated with the primary account number or the token. The instructions can further cause the processor to perform operations including determining, by the processing network computer, an address associated with the authorizing entity computer.

The instructions can further cause the processor to perform operations including transmitting, by the processing network computer, the push transfer message comprising the primary account number to the authorizing entity computer, which credits the primary account number for a second amount that is determined by subtracting a remainder amount from the first transaction amount. The instructions can further cause the processor to perform operations including performing a settlement process between at least the processing network computer, the authorizing entity computer, and the application server computer. The processing network computer can provide a service amount to the application server computer, the service amount being less than the remainder amount. The processing network computer can also associate a remaining portion of the remainder amount with the processing network computer. The processing network computer can also provide the second amount to the authorizing entity computer.

Another embodiment of the invention includes a method. The method can include receiving a payload comprising a digital tag associated with a second user and a first transaction amount for a transaction. The method can include generating a push transfer message comprising a first transaction amount, and a digital tag, a credential, or a token associated with the second user, the digital tag being associated with the credential or the token. The method can include transmitting the push transfer message to a processing network computer, which routes the push transfer message to an authorizing entity computer associated with the primary account number, and which credits the primary account number for a second amount that is determined by subtracting a remainder amount from the first transaction amount. The processing network computer can thereafter perform a settlement process and provide a service amount to an application server computer, the service amount being less than the remainder amount

DETAILED DESCRIPTION

Figure 1:
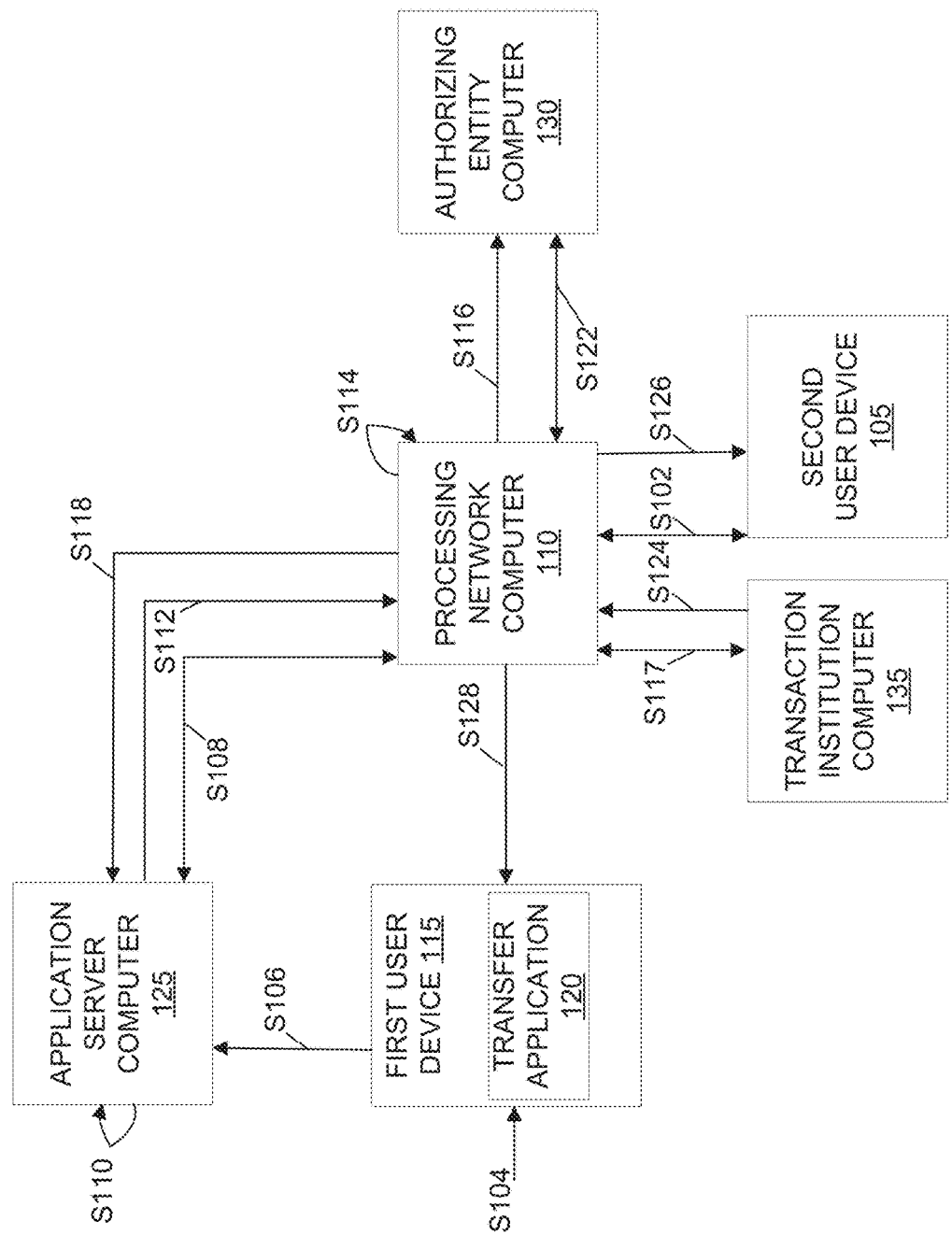
FIG. 1 is a block diagram illustrating a system according to an embodiment of the invention with an overlaid process flow.

Prior to discussing specific embodiments of the invention, some terms may be described in detail.

A "communication device" may include any suitable device that can allow for communication with an external entity. A communication device may be a mobile device if the mobile device has the ability to communicate data to and from an external entity.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. In some embodiments, payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., International Organization for Standardization (ISO) 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include a system that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant calls the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transfer application" can include an application facilitating the transfer of funds between multiple parties. For instance, a transfer application can include a peer to peer transaction application. The transfer application can be executed on a mobile device associated with a user, and the transfer application can be implemented using a server (e.g., application server computer) in communication with the mobile device. The transfer application can provide an account (e.g., from a digital wallet which may be part of the transfer application or external to it) for each user. The transfer application can allow a user to select a recipient user to transfer a specified amount of funds to the recipient user. The transfer application can then transfer the specified amount from an account for the user to an account for the recipient user.

An "application server computer" can be a server computer that is specifically designed to run applications. For instance, an application server computer can perform processing tasks relating to the above described transfer application, such as provide user account details to be displayed on the transfer application executing on the mobile device or facilitate transfer of funds between users on the transfer application. As described below, the application server computer can identify a digital tag specific to a resource provider, identify a credential from the digital tag, and generate a push transfer message facilitating a transaction via a processing network.

A "digital tag" can include an identifier that corresponds to a credential (e.g., a token, a primary account number, etc.) unique to a particular entity such as a resource provider. For example, a digital tag can include a phone number or e-mail address specific to the resource provider that corresponds to the credential (e.g., a payment account number such as a credit or debit card account number, or a payment token) for the resource provider. In some embodiments, the digital tag can be embedded in a QR code that can be captured by a transfer application. The application server computer or other entity can, in turn, identify a credential that corresponds to the digital tag.

A "push transfer message" can include a message that causes value (e.g., funds) to be pushed from one entity to another. In some embodiments, for example, a push transaction message can be generated by the application server computer to initiate a transaction between a user and a resource provider to push funds to the resource provider. In a push transaction, the funds transfer messaging is not first initiated by the intended recipient of the funds. The push transfer message can include user account details, a credential (identified from the digital tag) relating to the resource provider, and a transaction amount. In some instances, the push transfer message can comprise a original credit transaction (OCT) format.

A "settlement process" can is a process in which funds are actually delivered from one entity to one or more other entities to fulfil a transaction.

Embodiments of the invention can protect a user's information while also improving the acceptance of one or more transfer applications by entities such as resource providers. In embodiments of the invention, a resource provider can interact with a processing network computer to conduct transactions using any number of transfer applications. In response, the processing network computer can generate a digital tag corresponding to a credential (e.g., token, PAN) specific to the resource provider. In some embodiments, the digital tag can be presented to a user via a code (e.g., a QR code) that embeds or encodes the digital tag.

Responsive to capturing the digital tag (e.g., by inspecting the QR code) using a transfer application executing on a user device, an application server computer can retrieve the credential and generate a push transfer message to initiate the transaction between the user and resource provider. The push transfer message can be routed via a processing network for authorization by an authorizing entity computer. A settlement process can occur to direct amounts between the authorizing entity computer, a processing network computer, an application server computer, and a transaction institution computer.

As an illustrative example, first user interacting with a first user device (e.g., a mobile phone) can initiate a transaction using a transfer application (e.g., a peer to peer transaction application). The second user (e.g., a resource provider) can allow for a transaction to be completed using a selected transaction application. For instance, the first user can scan a QR code using the first user device to obtain a digital tag (or "alias") specific to the second user. The transfer application (e.g., via an associated application server computer) can obtain a credential from the digital tag and can initiate the transaction using a push transfer message.

The push transfer message including transaction details and the credential can be provided to a processing network computer configured to route the message to an authorizing entity computer. The authorizing entity computer can credit an account associated with the credential (e.g., primary account number) for a second amount that is determined by subtracting a remainder amount from the transaction amount. A settlement process can be initiated by the processing network computer to provide a service amount that is less than the remainder amount to the application server computer.

Embodiments of the invention have the following advantages. Embodiments of the invention allow for the efficient initiation of a transaction using a transfer application. Prior to initiating the transaction, during an initiation process, a resource provider can select a number of transfer applications to be used in transactions as described herein without requiring the creation of accounts for each selected transfer application. A processing network computer can generate a digital tag that corresponds to a credential and can be used across each of the multiple selected transfer applications. Further, the digital tag can mask the credential where only trusted devices (e.g., the application server computer) can obtain the credential, leading to increased security of private data (e.g., the credential). Additionally, performance of the settlement process by the system as described herein can efficiently provide amounts (e.g., a first transaction amount, a remainder amount, a service amount) to various devices according to terms specific to the transfer application and/or the transaction.

FIG. 1 is a block diagram illustrating an example system 100 according to embodiments of the invention. The system 100 includes a processing network computer 110 in operative communication with a first user device 115 executing a transfer application 120, a second user device 105, an application server computer 125, an authorizing entity computer 130, and a transaction institution computer 135. The first user device 115, the second user device 105, the processing network computer 110 and the application server computer 125 are described in further detail below with respect to FIGS. 2-4. In some embodiments, the first user device 115 may be a mobile phone operated by a first user, and the transfer application may be a wallet application. In such embodiments, the application server computer 125 may be in direct communication with the transfer application 120.

The components in the system of FIG. 1 and any of the following figures can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

Before any transactions are conducted with the first user device 115 and the transfer application 120, a second user of the second user device 105 can communicate with the processing network computer 110. At S102, a second user (e.g., a resource provider such as a merchant) associated with the second user device 105 (e.g., a device operated by a resource provider such as a merchant) and a processing network computer 110 can perform an initiation process. In some embodiments, the second user device 105 could be a POS terminal. The initiation process can include the second user, via second user device 105, selecting one or more transfer applications (e.g., digital wallet applications) that can be used in a transaction. For instance, the initiation process can include the processing network computer 110 sending data relating to a set of potential transfer applications to the second user device 105, and the second user can select one or more transfer applications of the set of potential transfer applications and provide the selection to the processing network computer 110. The selection of the one or more transfer applications can result in an agreement to terms unique to each of the one or more transfer applications. For example, in some embodiments, if the resource provider operating the second user device 105 selects a transfer application (e.g., digital wallet X) and provides the selection to the processing network computer 110, then the operator of that transfer application (the organization that operates digital wallet X) may receive a service amount for each transaction conducted using the selected transfer application (i.e., pursuant to an agreement).

Once a transfer application has been selected by the second entity operating the second user device 106, the processing network computer 110 can generate a digital tag (e.g., a username, e-mail address) specific to the second user (e.g., resource provider). It also can generate a scanable code (e.g., a quick response (QR) code), which can encode the digital tag, and can also encode data identifying the processing network computer 110. As noted above, the digital tag can be specific to the second user, such that a credential (e.g., a PAN) specific to the second user can be identified from the digital tag in the QR code. The QR code can be accessible to the first user such that a transaction can be initiated by the first user device 115 using the QR code. The initiation process between the second user and the processing network is discussed in greater detail with respect to FIGS. 5-6.

Referring again to FIG. 1, at step S104, the first user, using first user device 115, can execute a transfer application 120 (e.g., a peer to peer transfer application) to initiate a transaction. The transfer application 120 can include an application selected by the second user during the initiation process (e.g., as described with respect to S102). The digital tag can be obtained by the transfer application by identifying the digital tag as part of data embedded in a quick response (QR) code captured by the transfer application. For instance, the first user, using transfer application 120, can capture the QR code (e.g., by capturing an image of the QR code using a camera of the first user device 115). The QR code can embed information identifying a processing network and/or the digital tag specific to the second user (e.g., the resource provider). The QR code can be displayed by the second user device 105, some other device operated by the second user, or it could be printed on a static medium such as paper. The first user device 115 can then scan the QR code presented by the second user (e.g., the resource provider).

In some instances, the first user interacting with the transfer application 120 can provide one or more of the transaction details (e.g., a transaction amount, an account number or token, etc.). In other instances, one or more the transaction details can be provided from a second user device 105 to the first user device 115.

At step S106, a payload that includes transaction details and the digital tag can be transmitted to the application server computer 125. The application server computer 125 can be capable implementing and maintaining the transfer application 120, and initiating a process for identifying the digital tag obtained from the first user device 115.

At step S108, after the payload is received by the application server computer 125 from the transfer application of the first user device 115, the application server computer 125 can determine a credential (e.g., a primary account number or a token) associated with the digital tag. Determining the credential can include identifying an address of the processing network computer 110 from the payload and then transmitting a digital tag resolution request message comprising the digital dag to the processing network computer 110. The processing network computer 110 then receives the digital tag resolution request message comprising the digital tag from the application server computer 125. In response, the processing network computer 110 can search a database for the credential corresponding to the digital tag. The processing network computer 110 can then generate a digital tag resolution response message comprising the token or the primary account number corresponding to the digital tag. After generating the digital tag resolution response message, the processing network computer 110 can transmit the digital tag resolution response message to the application server computer 125. Prior to sending the digital tag resolution response message, the processing network computer 110 verify that the application server computer 125 is a trusted device. This can be done in any suitable manner including verifying a verifying a digital signature of the application server computer 125.

In other embodiments, the application server computer 125 may have previously obtained the credential and mapped the credential to the digital tag. The mapping of the credential and the digital tag can be stored in a digital tag/credential store (e.g., 306 in FIG. 3). In such embodiments, the credential or token associated with the digital tag may be determined without communicating with the processing network computer 110. In still other embodiments, the digital tag can be included in a push transfer message that is sent to the processing network computer 110, and the processing network computer 110 can determine the credential or token corresponding to the digital tag.

At step S110, after obtaining the credential (e.g., an account number) or the token, the application server computer 125 can generate a push transfer message using the credential or the token. The push transfer message can include a first transaction amount and the credential or token associated with the second user. It may also include an identifier for the transfer application. In some embodiments, the push transfer message can also include an account number or token associated with the first user of the first user device 115. The push transfer message subsequently be processed by the processing network computer 110 and authorizing entity computer 130.

In some embodiments, the push transfer instruction message may be an OCT (Original Credit Transaction) message. An OCT (Original Credit Transaction) can be a clearing and settlement credit transaction designed for use in business applications such as a business money transfer or business-to-consumer repayments. The OCT can be a transaction used to deliver funds to the recipient account. It is separate from, and can take place after, an Account Funding Transaction (AFT) transaction in some cases. An AFT can be a transaction designed to supply funds to another account such as a credit, prepaid, debit, ATM or on-line account. This timing is to ensure that payment funds are secured before funds are sent to the recipient.

The amount of the OCT can be the amount agreed to by the sender and the service provider in the currency agreed. The OCT can carry the account number of the recipient and no information about the sender. A special indicator can identify an OCT to the recipient's issuer bank. Settlement can take place within two days, or more or less time than this.

In embodiments of the invention, the push transfer message may be generated for a transaction where a first user using a first user device 115 provides a value to a second user using the digital tag. The digital tag can be associated with the primary account number or the token and the first user device 115 can comprise the transfer application 120 that receives the digital tag and is in communication with the application server computer 125. The application server computer 125 can identify a processing network computer from data embedded in the QR code and can route the push transfer message to the corresponding processing network computer 110.

At step S112, the application server computer 125 can transmit the push transfer message to the processing network computer 110. The processing network computer 110 can the receive the push transfer message comprising the first transaction amount, and the primary account number or the token associated with the digital tag from the application server computer 125.

At step S113, the processing network computer 110 can parse the push transfer message to determine an authorizing entity computer 130 associated with the primary account number or the token. This can include determining the authorizing entity computer 130 associated with the credential or the token by searching a database that correlates the primary account number or token with an address of the authorizing entity computer 130. In some embodiments, if the push transfer message includes a token, the processing network computer 110 may determine a primary account number associated with the token. The token-account number mapping may be present in a database in the processing network computer 110 or in a database external to the processing network computer 110. The authorizing entity computer 130 can then be determined by analyzing the credential. For example, the first six digits of a credential such as a primary account number may be a BIN (bank identification number), which identifies the authorizing entity computer 130 associated with the primary account number.

At step S114, the processing network computer 110 can determine an address associated with the authorizing entity computer 130. For instance, as noted above, the processing network computer 110 can identify the authorizing entity computer 130 and the address of the authorizing entity computer (e.g., an internet protocol address specific to the authorizing entity computer) based on the credential included in the push transfer message.

In some instances, the processing network computer 110 can process the push transfer message and it can identify whether the transfer application is included in a set of selected transfer applications previously selected by the resource provider in an initiation process (e.g., S102). This can include analyzing an identifier unique to the transfer application that was included in the push transfer message, and determining if the identifier is associated with a transfer application in a set of transfer applications previously selected by the resource provider, and stored by the processing network computer 110.

In response to determining that the transfer application is included in the set transfer applications that was previously selected by the second user (e.g., a resource provider), the push transfer message can be routed to the authorizing entity computer 130 associated with the primary account number (e.g., at S116). In some instances, if the transfer application 120 that provided the push transfer message is not included in the set transfer applications, the processing network computer 110 can reject the push transfer message transmit a notification to the application server computer 125 that the push transfer message has been rejected.

At step S116, the processing network computer 110 can transmit the push transfer message to an authorizing entity computer 130 associated with the primary account number. In some embodiments, the push transfer message may be modified to include a remainder amount, along with the first amount. Alternatively, the processing network computer 110 can modify the first amount to a second amount, which is the first amount less than the remainder amount. For example, if the first amount is $100 and the remainder amount is $3.00, then the second amount is $97.00.

After receiving the push transfer message and validating it (e.g., by checking to see that it originated from a trusted computer such as the processing network computer 110), the authorizing entity computer 130 can credit the account primary account number for the second amount. As noted above, the second amount can be determined by subtracting a remainder amount from the first transaction amount. The subtraction can be performed by the processing network computer 110 or the authorizing entity computer 130. In some instances, the authorizing entity computer 130 can verify the transaction (e.g., by verifying the credential provided in the push transfer message is associated with a valid account that it maintains) before crediting any account.

At step S117, a transaction institution computer 135 can perform a clearing and settlement process with processing network computer 110. The transaction institution computer 135 can include a server computer associated with an institution managing funds associated with user accounts for the transfer application. For instance, a user holding an amount of funds on the transfer application can be managed by the transaction institution computer 135. The clearing and settlement process can include routing the first amount from the account associated with the first user to the processing network computer 110. For example if the first amount is $100, then $100 will be transferred from the transaction institution computer 136 to the processing network computer 110. Note that this transfer can be done in batch with other transfers to other financial institutions.

At step S118, the processing network computer 110 can perform a settlement process between at least the processing network computer 110 and the application server computer 125. In the settlement process, the processing network computer 110 can transfer funds equal to the second amount to the authorizing entity computer 130 which credited the account of the second user, and a service amount to the application server computer 125. The service amount can be less than the remainder amount. For example, as noted in the above example, if the remainder amount is $3, then the service amount may be $1. The service amount can include an amount according to terms specific to the transfer application 120. The different between the remainder amount (e.g., $3) and the service amount (e.g., $1) can be a processing fee amount (e.g., $2) which may be eventually provided to one or more entities operating the processing network computer 110, the transaction institution computer 135 and/or the authorizing entity computer 130.

At step S122, the processing network computer 110 can provide the funds associated with the second amount to the authorizing entity computer 130 in a clearing and settlement process. The second amount (e.g., $97) can be the first amount (e.g., $100) minus the reminder amount (e.g., $3) described above. The second user's account at the authorizing entity computer 130 was previously credited with the second amount.

At step S124, in some embodiments, the transaction institution computer 135 (e.g., a wallet provider acquirer computer) can provide an interchange reimbursement amount (e.g., IRF) to the authorizing entity computer 130. The IRF amount can be forwarded to the authorizing entity computer 130 via the processing network computer 110. The IRF amount can be included in the processing fee amount as described herein.

At step S126, the processing network computer can provide a transaction success notification to second user device 105. The transaction success notification can provide details relating to the transaction and specify that the transaction was successful.

At step S128, the processing network computer 110 can provide a transaction success notification to the transfer application 120 on the first user device 116. The transaction success notification can provide details relating to the transaction and specify that the transaction was successful.

Figure 2:
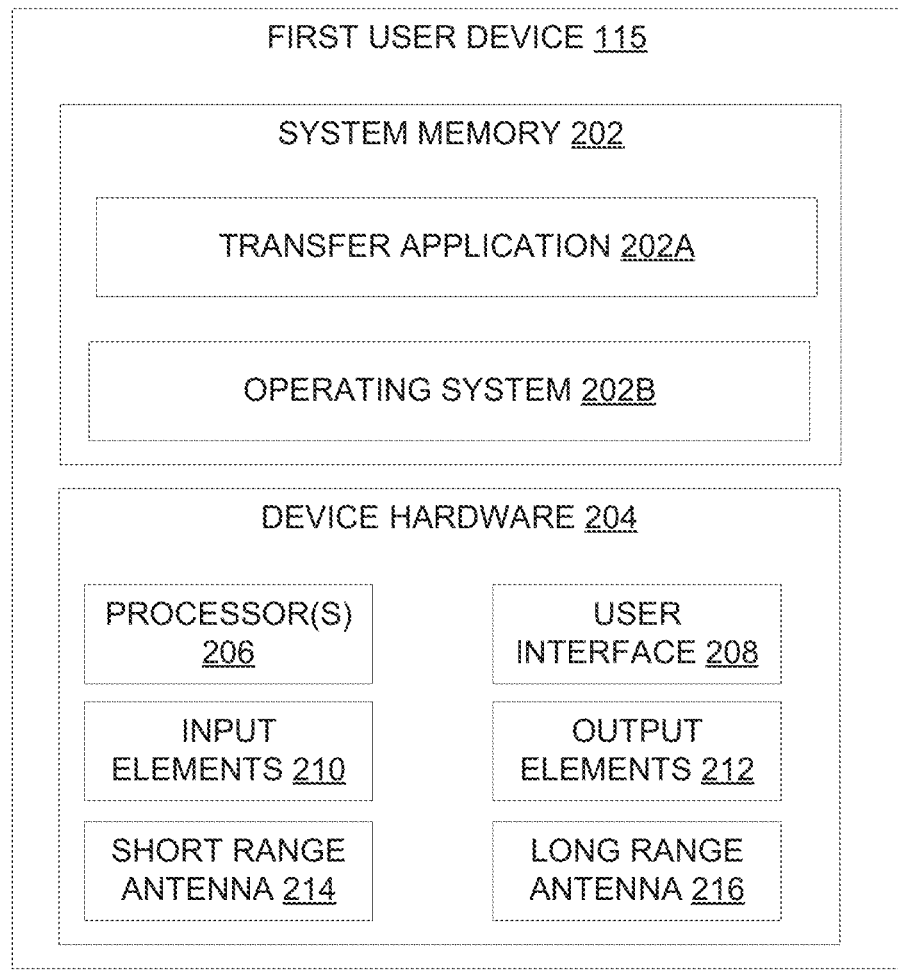
FIG. 2 is a block diagram illustrating a first user device according to an embodiment.

FIG. 2 is a block diagram illustrating an example first user device 115. The first user device 115 can be a mobile device (e.g., mobile phone) with a transfer application (e.g., 120). The first user device 115 can be capable of performing processing tasks as described herein. The first user device 115 may include device hardware 204 coupled to a system memory 202. The first user device 115 can perform the functions described above with respect to FIG. 1.

Device hardware 204 may include a processor 206, a short range antenna 214, a long range antenna 216, input elements 210, a user interface 208, and output elements 212 (which may be part of the user interface 208). Examples of input elements may include microphones, keypads, touchscreens, sensors, etc. Examples of output elements may include speakers, display screens, and tactile devices. The processor 206 can be implemented as one or more integrated circuits (e.g., one or more single core or multicore microprocessors and/or microcontrollers), and is used to control the operation of first user device 115. The processor 206 can execute a variety of programs in response to program code or computer-readable code stored in the system memory 202, and can maintain multiple concurrently executing programs or processes.

The long range antenna 216 may include one or more RF transceivers and/or connectors that can be used by first user device 115 to communicate with other devices and/or to connect with external networks. The user interface 208 can include any combination of input and output elements to allow a user to interact with and invoke the functionalities of first user device 115. The short range antenna 209 may be configured to communicate with external entities through a short range communication medium (e.g. using Bluetooth, Wi-Fi, infrared, NFC, etc.). The long range antenna 219 may be configured to communicate with a remote base station and a remote cellular or data network, over the air.

The system memory 202 can be implemented using any combination of any number of non-volatile memories (e.g., flash memory) and volatile memories (e.g. DRAM, SRAM), or any other non-transitory storage medium, or a combination thereof media. The system memory 202 may store computer code, executable by the processor 805, for performing any of the functions described herein. For example, the system memory 202 may comprise a computer readable medium comprising code, executable by the processor 206, for implementing a method as described herein.

The system memory 202 may also store a transfer application 202A and/or an operating system 202B. The transfer application 202A may include instructions or code implementing a transfer application for initiating and conducting a transaction based on an input, such as scanning a QR code. The transfer application 202A may also include code, executable by the processor 206, for obtaining a payload including transaction details and an digital tag specific to a resource provider, providing the payload to an application server computer, and/or forwarding a push transfer message to the processing network computer.

Figure 3:
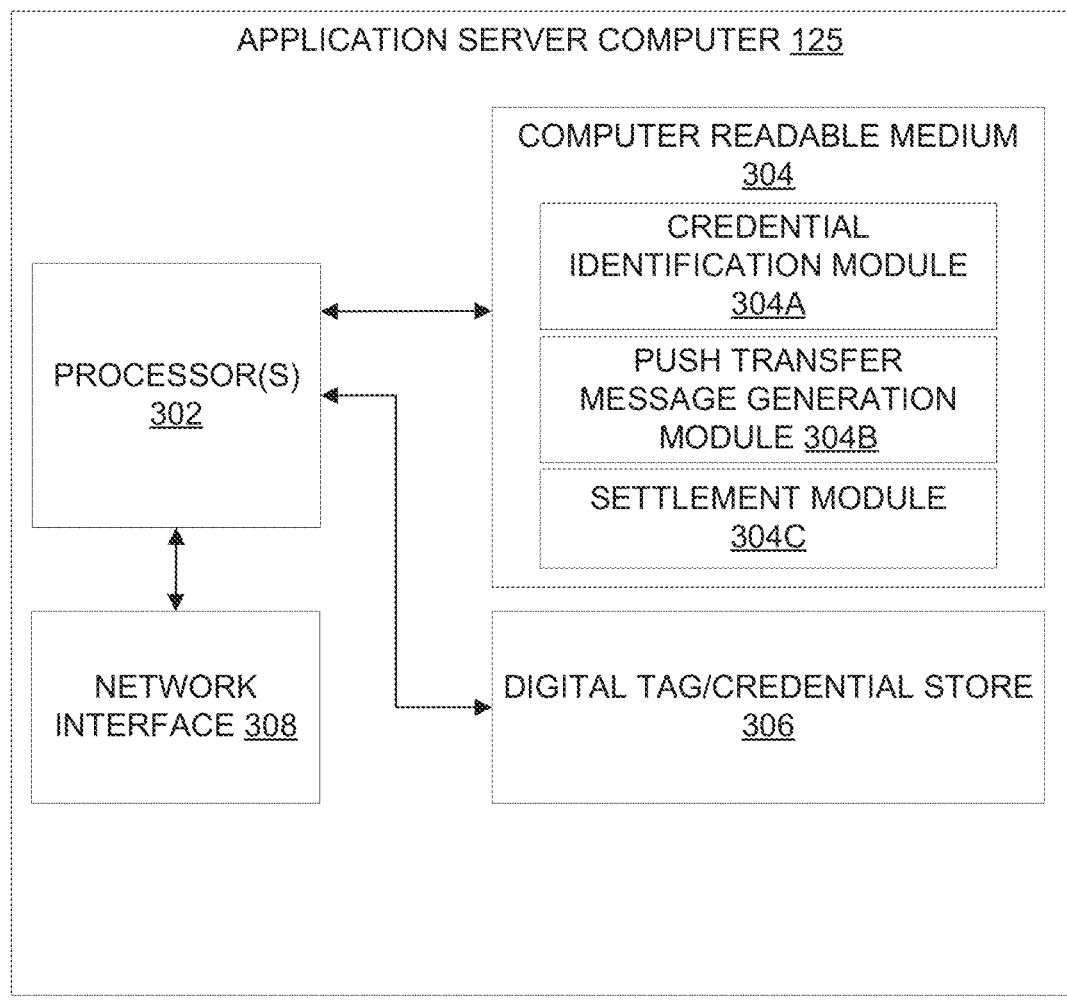
FIG. 3 shows a block diagram of an application server computer according to an embodiment.

FIG. 3 shows an example application server computer 125 according to an embodiment. The application server computer 125 can implement and maintain the previously described transfer application. For instance, the application server computer 125 can provide data relating to the transfer application and can receive a payload from the transfer application. The application server computer 125 can determine a credential based on a digital tag included in the payload and generate a push transfer message as described herein. The application server computer 125 can include a processor 302 and a computer readable medium 304, a digital tag/credential store 306, and a network interface 308 coupled to the processor 302.

The computer readable medium 304 may comprise a credential identification module 304A. The credential identification module 304A can include instructions to identify an digital tag and determine a credential (e.g., a PAN, token) that corresponds to the digital tag. In some instances, this can include mapping an digital tag to a credential in the digital tag/credential store 306. In other instances, determining the credential can include requesting a credential from a processing network computer using the digital tag and obtaining the credential from the processing network computer. In response, the credential can be stored as associated with the digital tag in the digital tag/credential store 306.

The computer readable medium 304 may comprise a push transfer message generation module 304B. The push transfer message generation module 304B can include instructions to generate a push transfer message. The push transfer message can include a message capable of facilitating the transaction by the processing network computer. The push transfer message can include the transaction details and the credential for a resource provider. The push transfer message can be provided to the processing network computer either directly from the application server computer or via the transfer application.

The computer readable medium 304 may comprise a settlement module 304C. The settlement module 304C can facilitate a settlement process with processing network computer. For instance, the settlement module 304C can obtain a remainder amount provided by a processing network computer. A digital tag/credential store 306 can store credentials (e.g., PAN, tokens) and corresponding digital tag instances in a database.

Figure 4:
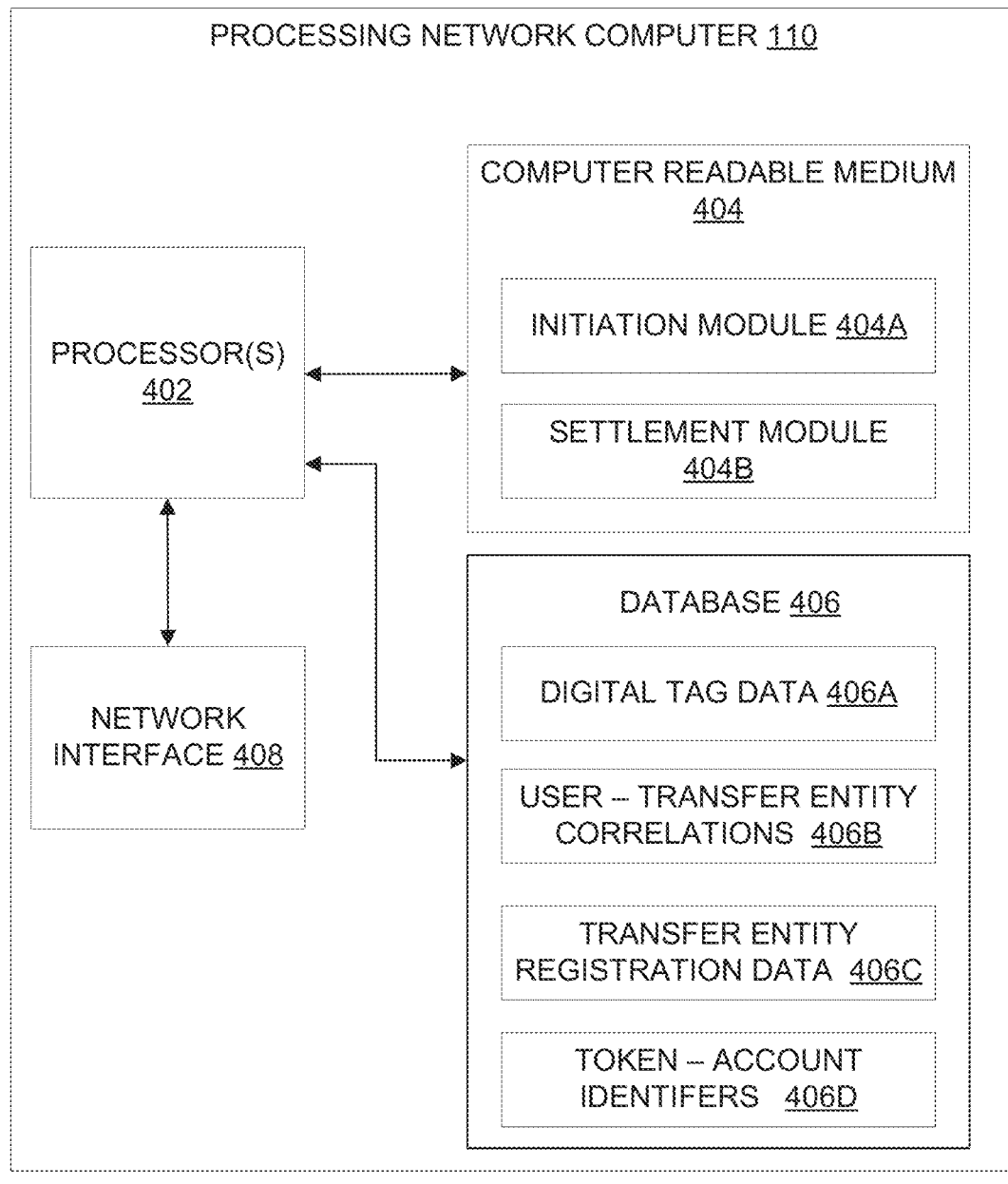
FIG. 4 shows a block diagram of a processing network computer according to an embodiment.

FIG. 4 shows an example processing network computer 110 according to an embodiment. The processing network computer 110 can include a computing device (or series of interconnected computing devices) capable of performing an initiation process with a resource provider, routing a push transfer message, and performing a settlement process as described herein. The processing network computer 110 can include a processor 402 and a computer readable medium 404, a database 406, and a network interface 408 coupled to the processor 402.

The computer readable medium 404 may comprise an initiation module 404a. The initiation module 404A may comprise code that causes the processor 402 to perform an initiation process with a resource provider (e.g., or second user).

The initiation process can include the second user selecting one or more transfer applications that can be included as part of a transaction relating to the second user. For instance, this can include the processing network computer sending a set of transfer applications (or their identifiers) to the second user device, and the second user can selecting one or more transfer applications in the set of transfer applications and provide the selection to the processing network computer. The processing network computer can generate an digital tag (e.g., a username, e-mail address) specific to the second user and can generate a code (e.g., a QR code) that identifies the processing network and the digital tag specific to the second user such that a credential (e.g., a PAN) specific to the second user can be identified from the QR code.

The settlement module 404B may comprise code that causes the processor 402 to perform a settlement process. For instance, the settlement module 404B can determine a remainder amount from a first transaction amount. The remainder amount can be an amount reserved for the processing network and the transaction application. The settlement module 404B can identify a portion of the remainder amount as a service amount to be provided to the application server computer. The service amount can be less than the remainder amount. In some instances, the application server computer can generate the service amount and provide an indication of the service amount to the settlement module 404B. The processing network computer can also associate a remaining portion of the remainder amount to the processing network computer (e.g., as a processing fee).

A database 406 can store various data types to facilitate the routing of data across a processing network. The database can include digital tag data 406A. The digital tag data 406A can include information relating to a digital tag, such as a mapping between digital tags and credentials (e.g., tokens, PANs). The digital tag data 406A can be used to identify a credential that corresponds with a digital tag included in a request for a credential from the application service computer.

The database 406 can include user—transfer entity correlations 406B. The user—transfer entity correlations 406B can map user account information (e.g., usernames, user account data) to corresponding transfer entities (e.g., transfer applications, transaction institutions).

The database 406 can also include transfer entity registration data 406C. Transfer entity registration data 406C can include data relating to transfer application and/or transaction institutions. Example transfer entity registration data 406C relating to a transfer application can include terms specific to each transfer application, IP addresses of application server computers associated with the transfer application, user account details relating to the transfer application, etc. Example transfer entity registration data 406C relating to a transaction institution can include data identifying the transaction institution or user account data maintained by the transaction institution.

The database 406 can also include token—account identifiers 406D. The token—account identifiers 406D can include a mapping between tokens generated for a user account. For example, a token can correspond to an identifier (e.g., a PAN, account number) associated with an account maintained by an authorizing entity or a financial institution.

Figure 5:
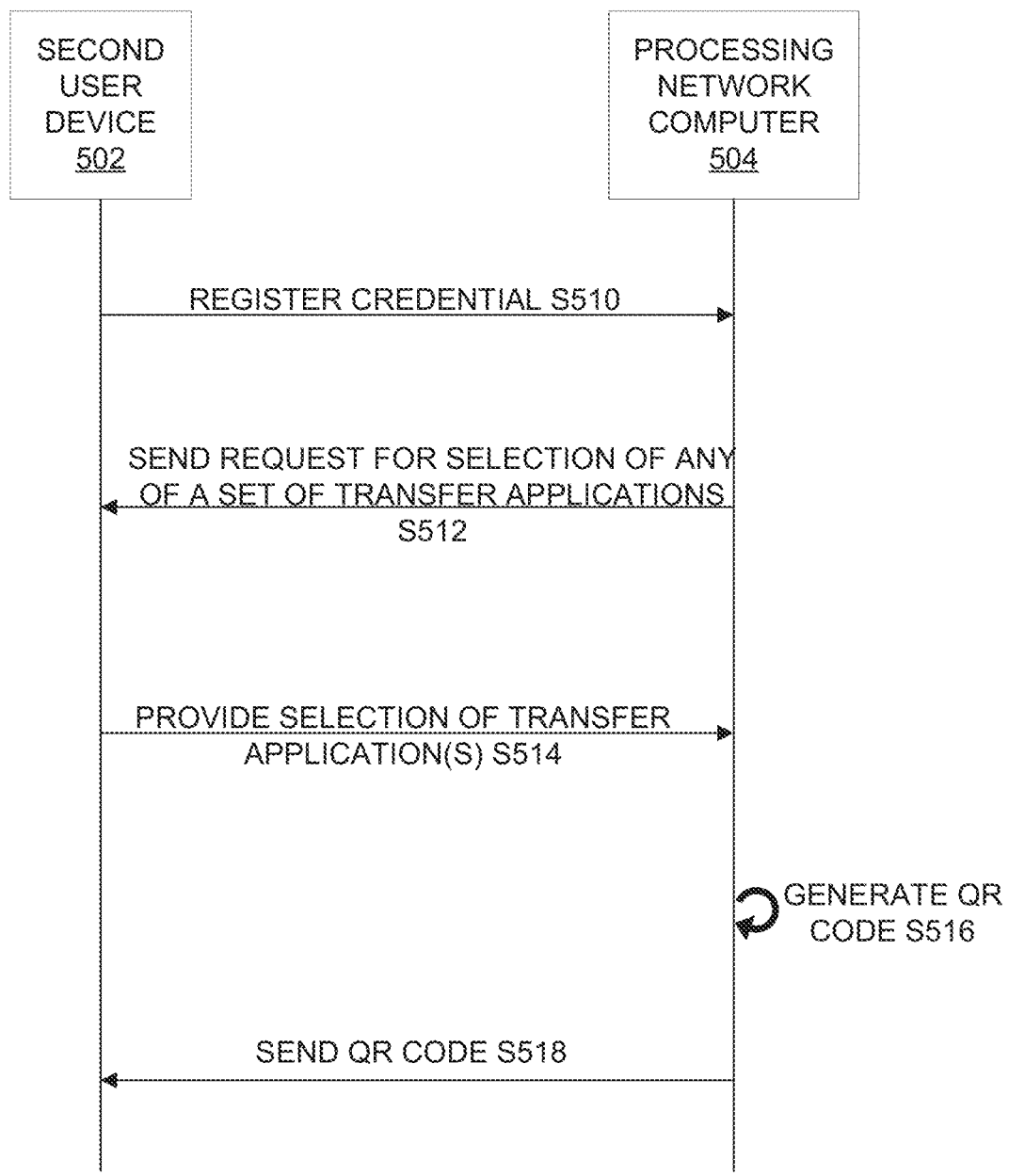
FIG. 5 shows a flow diagram showing an initiation process according to an embodiment.

As described above, the resource provider and a processing network can perform an initiation process to allow for a transaction including a transfer application. FIG. 5 is a signaling process 500 illustrating an example initiation process. As shown in FIG. 5, a second user device 502 (e.g., a device associated with a resource provider) and a processing network computer 504 can interact to perform the initiation process.

At step S510, the second user device 502 (e.g., a device associated with a resource provider) can register a credential (e.g., a PAN, token) with the processing network computer 504. Registering a credential can include a request to allow one or more selected transfer applications to perform a transaction as described herein.

At S512, the processing network computer 504 can send a request for selection of any of a set of transfer applications to the second user device 502. The request can include an interface displayed on the second user device providing the set of transfer applications and terms (e.g., a service amount or percentage) associated with each transfer application. An example interface is shown as interface 602 in FIG. 6.

At S514, the second user device 502 can provide the selection of any transfer application(s) to the processing network computer 504. The processing network computer 504 can identify all transfer applications selected by the resource provider and generate a digital tag for the resource provider that corresponds with the credential. The digital tag can be common among multiple transfer applications to identify the resource provider across the multiple transfer applications. The digital tag and can be used to identify the resource provider and/or the credential without the resource provider having to separately register for each of the multiple transfer applications.

At step S516, the processing network computer 504 can generate a QR code. The QR code can embed information identifying the digital tag and/or the processing network to facilitate a transaction using the transfer application. The QR code can be printed or otherwise provided to users such that the users, via user devices, can capture the QR code and identify the data embedded in the code.

At step S518, the processing network computer 504 can send the QR code to the second user device 502. The resource provider can provide the QR code to other users such that the users can interact with the QR code. For instance, a first user can capture an image of the QR code using a camera on a first user device. The QR code can provide a digital representation of the digital tag and an indication of the processing network that can be used to identify the credential.

Figure 6:
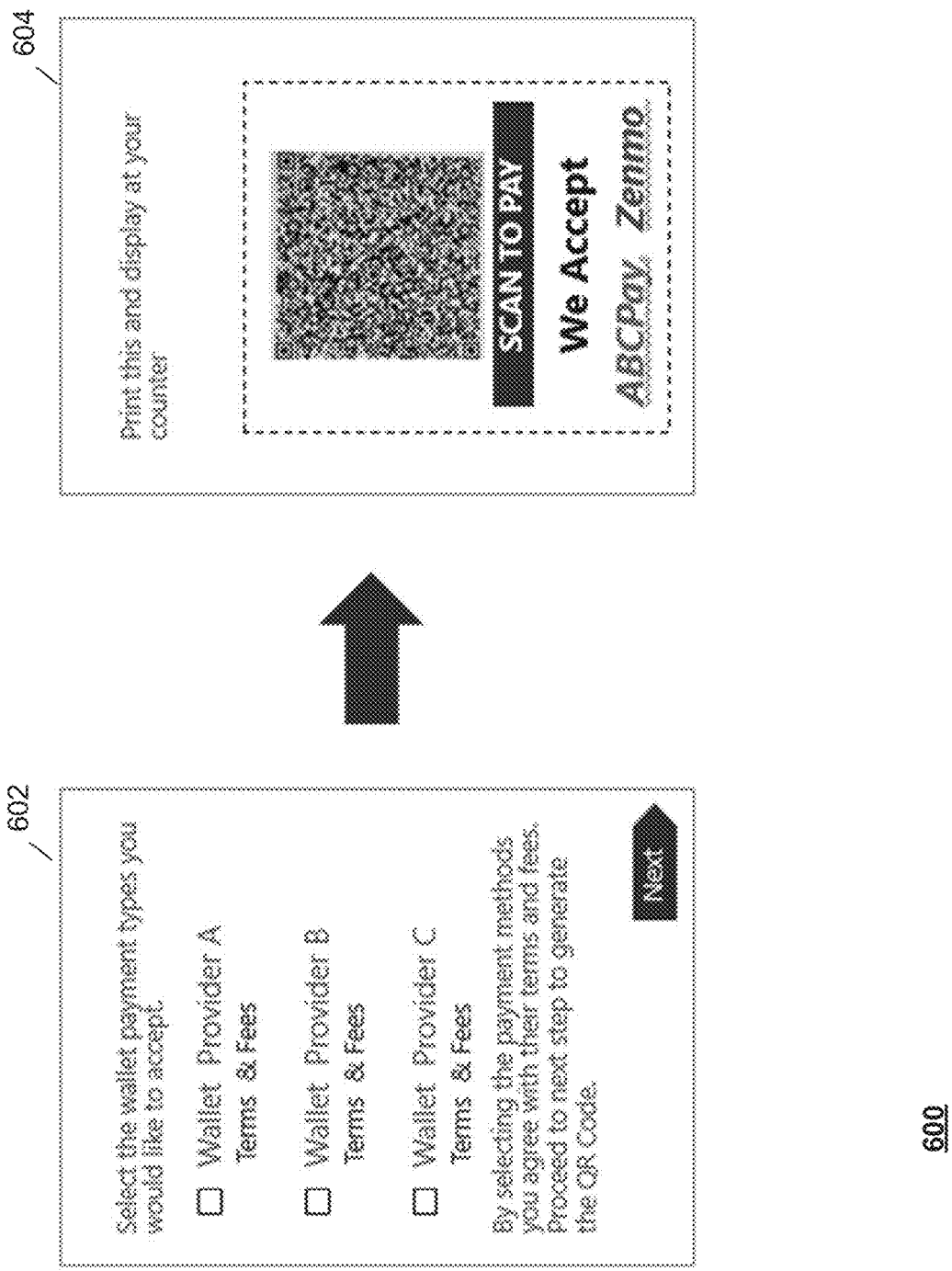
FIG. 6 shows example user interfaces displayed on a second user device during an initiation process according to an embodiment.

FIG. 6 illustrates multiple example interfaces 602, 604 displayed on a second user device during an initiation process. For instance, at 602, a first interface provides multiple transfer applications (e.g., wallet provider A, wallet provider B, wallet provider C) and terms relating to each transfer application. The resource provider can select any of the set of transfer applications that can be allowed in transactions relating to the resource provider.

At 604, a second interface provides an example QR code provided to the second user device. The QR code can be provided to other users (e.g., printed) such that the transfer application can identify a digital tag from the QR code for use in generation of the push transfer message.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A method comprising:
   managing, by an application server computer, a transfer application executed on a first user device;
   receiving, by the application server computer from the first user device executing the transfer application, a payload comprising a digital tag associated with a second user and a first transaction amount for a transaction, wherein a first user operating the first user device is registered with the application server computer and the second user is not registered with the application server computer, wherein the digital tag is received by the transfer application by identifying the digital tag as part of data embedded in a quick response (QR) code captured by the transfer application, wherein the digital tag is compatible with a plurality of transfer applications without requiring the second user to register with each one of the plurality of transfer applications, wherein the digital tag is identifiable by the application server computer managing any one of the plurality of transfer applications;
   generating, by the application server computer, a push transfer message comprising the first transaction amount, and the digital tag, a primary account number, or a token associated with the second user, the digital tag being associated with the primary account number or the token;
   transmitting, by the application server computer, the push transfer message to a processing network computer, which routes the push transfer message to an authorizing entity computer associated with the primary account number, and which credits the primary account number for a second amount that is determined by subtracting a remainder amount from the first transaction amount; and
   performing a settlement process between at least the processing network computer, the authorizing entity computer, and the application server computer, wherein the processing network computer provides a service amount to the application server computer, the service amount being less than the remainder amount.

2. The method of claim 1, further comprising:
   prior to the transaction, establishing a processing relationship with the processing network computer, wherein establishing the processing relationship includes agreeing to processing terms for transactions initiated using the transfer application,
   wherein the transaction is processed pursuant to the processing terms associated with the transfer application.

3. The method of claim 1, wherein the push transfer message is an original credit transaction (OCT) message indicating a clearing and settlement credit transaction for delivering funds to the primary account number.

4. The method of claim 1, wherein the push transfer message comprises the primary account number or the token.

5. The method of claim 1, further comprising:
   transmitting a digital tag resolution request message comprising the digital tag to the processing network computer; and
   receiving a digital tag resolution response message comprising the token or the primary account number from the processing network computer.

6. The method of claim 1, wherein the digital tag comprises a text-based identifier unique to the second user.

7. The method of claim 1, further comprising:
   transmitting, to the processing network computer, a request for a credential, the request including the digital tag, wherein the processing network computer identifies the credential that corresponds to the digital tag, the credential including the primary account number or the token; and
   receiving the credential from the processing network computer.

8. An application server computer comprising:
   a processor; and
   a non-transitory computer-readable medium including instructions that, when executed by the processor, cause the processor to perform operations comprising:
   managing a transfer application executed on a first user device;
   receiving, from the first user device executing the transfer application, a payload comprising a digital tag associated with a second user and a first transaction amount for a transaction, wherein a first user operating the first user device is registered with the application server computer and the second user is not registered with the application server computer, wherein the digital tag is received by the transfer application by identifying the digital tag as part of data embedded in a quick response (OR) code captured by the transfer application, wherein the digital tag is compatible with a plurality of transfer applications without requiring the second user to register with each one of the plurality of transfer applications, wherein the digital tag is identifiable by the application server computer managing any one of the plurality of transfer applications;

generating a push transfer message comprising the first transaction amount, and the digital tag, a primary account number, or a token associated with the second user, the digital tag being associated with the primary account number or the token;

transmitting the push transfer message to a processing network computer, which routes the push transfer message to an authorizing entity computer associated with the primary account number, and which credits the primary account number for a second amount that is determined by subtracting a remainder amount from the first transaction amount; and performing a settlement process between at least the processing network computer, the authorizing entity computer, and the application server computer, wherein the processing network computer provides a service amount to the application server computer, the service amount being less than the remainder amount.

9. The application server computer of claim 8, wherein the operations further comprise:

prior to the transaction, establishing a processing relationship with the processing network computer, wherein establishing the processing relationship includes agreeing to processing terms for transactions initiated using the transfer application, wherein the transaction is processed pursuant to the processing terms associated with the transfer application.

10. The application server computer of claim 8, wherein the push transfer message is an original credit transaction (OCT) message indicating a clearing and settlement credit transaction for delivering funds to the primary account number.

11. The application server computer of claim 8, wherein the push transfer message comprises the primary account number or the token.

12. The application server computer of claim 8, wherein the operations further comprise:

transmitting a digital tag resolution request message comprising the digital tag to the processing network computer; and receiving a digital tag resolution response message comprising the token or the primary account number from the processing network computer.

13. The application server computer of claim 8, wherein the digital tag comprises a text-based identifier unique to the second user.

14. The application server computer of claim 8, wherein the operations further comprise:

transmitting, to the processing network computer, a request for a credential, the request including the digital tag, wherein the processing network computer identifies the credential that corresponds to the digital tag, the credential including the primary account number or the token; and receiving the credential from the processing network computer.

\* \* \* \* \*